(12) United States Patent
Terada

(10) Patent No.: US 9,900,719 B2
(45) Date of Patent: Feb. 20, 2018

(54) LEVEL SETTING APPARATUS AND STORAGE MEDIUM

(71) Applicant: YAMAHA CORPORATION, Hamamatsu-shi, Shizuoka-ken (JP)

(72) Inventor: Kotaro Terada, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/066,459

(22) Filed: Mar. 10, 2016

(65) Prior Publication Data

US 2016/0269843 A1 Sep. 15, 2016

(30) Foreign Application Priority Data

Mar. 11, 2015 (JP) .................................. 2015-048468

(51) Int. Cl.
*H03G 3/00* (2006.01)
*H04R 29/00* (2006.01)
*G06F 3/16* (2006.01)

(52) U.S. Cl.
CPC ........... *H04R 29/008* (2013.01); *G06F 3/162* (2013.01); *H04R 2430/01* (2013.01)

(58) Field of Classification Search
None
See application file for complete search history.

(56) References Cited

U.S. PATENT DOCUMENTS

| 4,528,501 | A | * | 7/1985 | Dorrough | G01R 13/405 |
| | | | | | 324/103 P |
| 6,879,864 | B1 | * | 4/2005 | Cleary, Jr. | H04S 7/40 |
| | | | | | 345/40 |
| 2006/0215857 | A1 | * | 9/2006 | Hirano | H04H 60/04 |
| | | | | | 381/119 |
| 2006/0291666 | A1 | * | 12/2006 | Ball | H04R 29/008 |
| | | | | | 381/58 |
| 2009/0028359 | A1 | * | 1/2009 | Terada | H04S 7/00 |
| | | | | | 381/119 |

FOREIGN PATENT DOCUMENTS

JP 2004253876 A 9/2004

* cited by examiner

*Primary Examiner* — Joseph Saunders, Jr.
*Assistant Examiner* — James Mooney
(74) *Attorney, Agent, or Firm* — Rossi, Kimms & McDowell LLP

(57) ABSTRACT

A fader level set for a fader of a channel is displayed at a channel level display section in a channel screen by, for example, a length of a bar, and a channel level indicating level of output from the channel is overlay-displayed by an indicator on the channel level display section at a position corresponding to the level to be displayed. It is thereby possible to compare the fader level set for the fader of the channel and the channel level indicating level of output from the channel by checking the channel level display section in the channel screen.

8 Claims, 5 Drawing Sheets

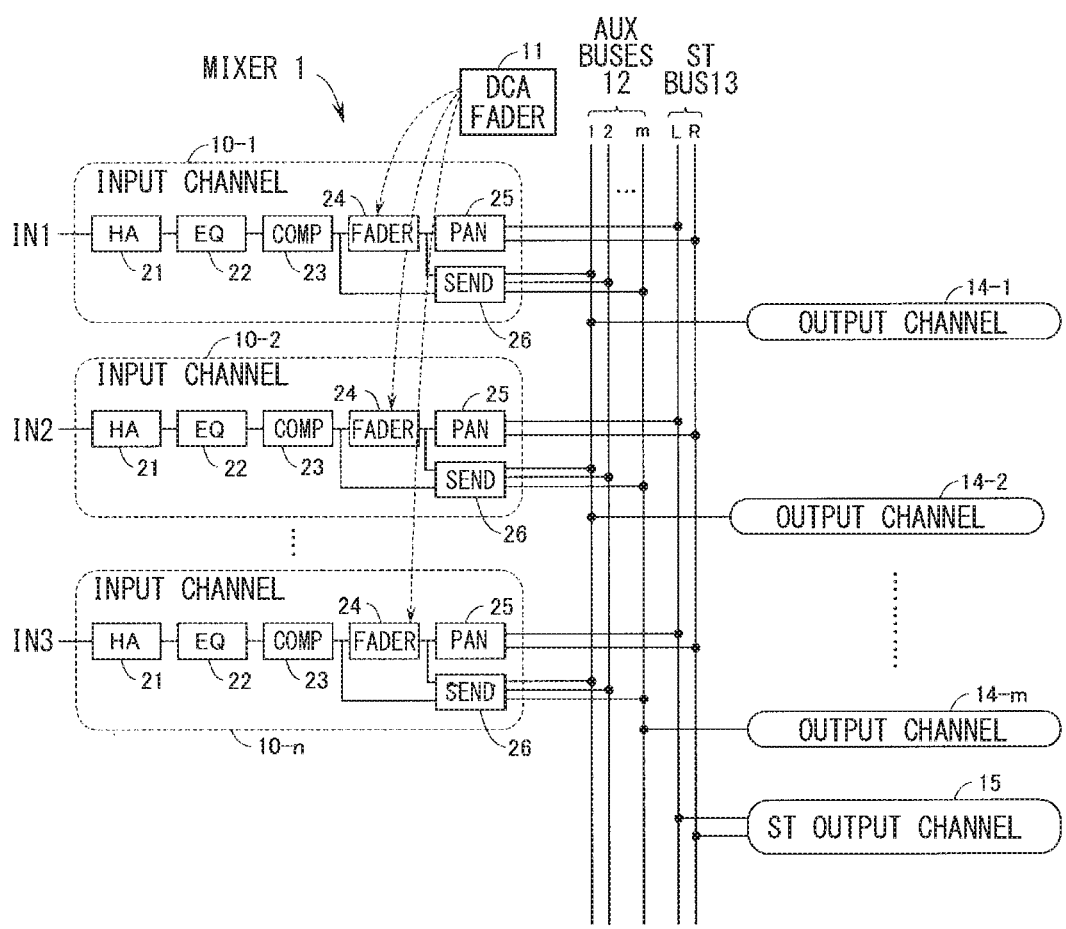
{Fig. 1}

{Fig. 2}
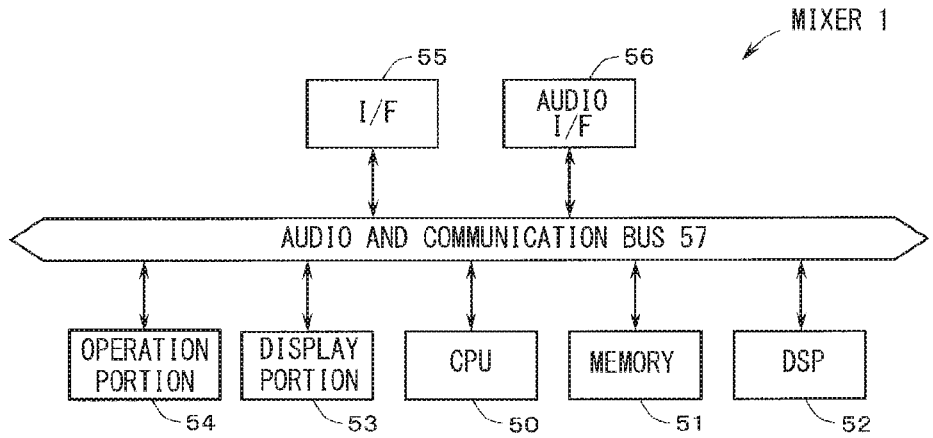
{Fig. 3}
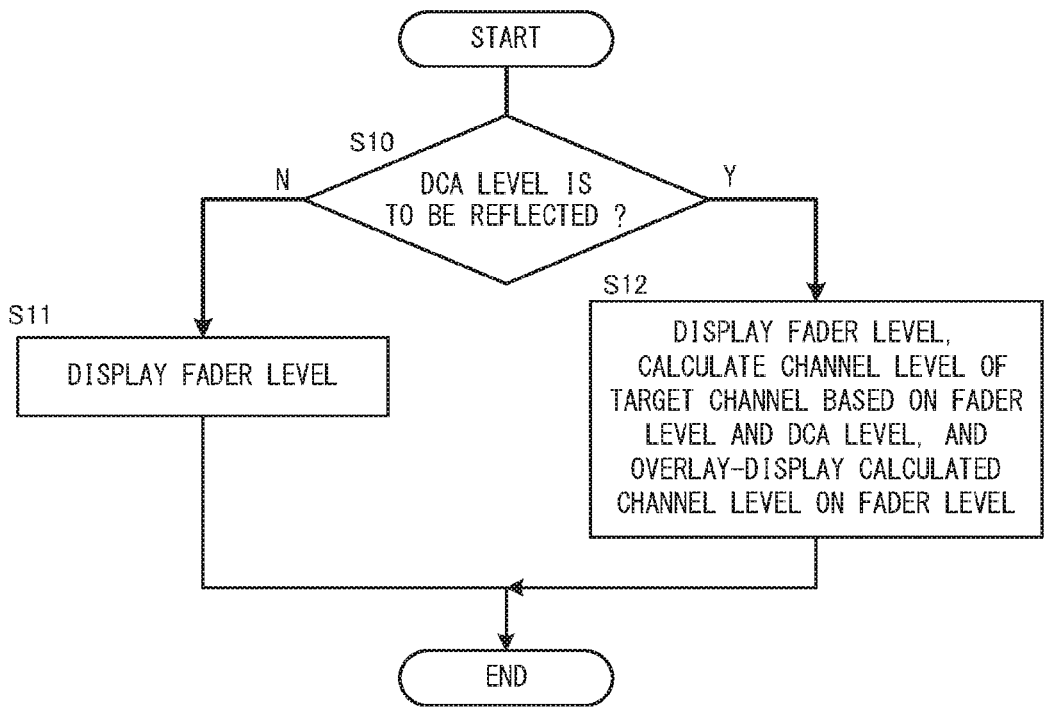

{Fig. 4A}
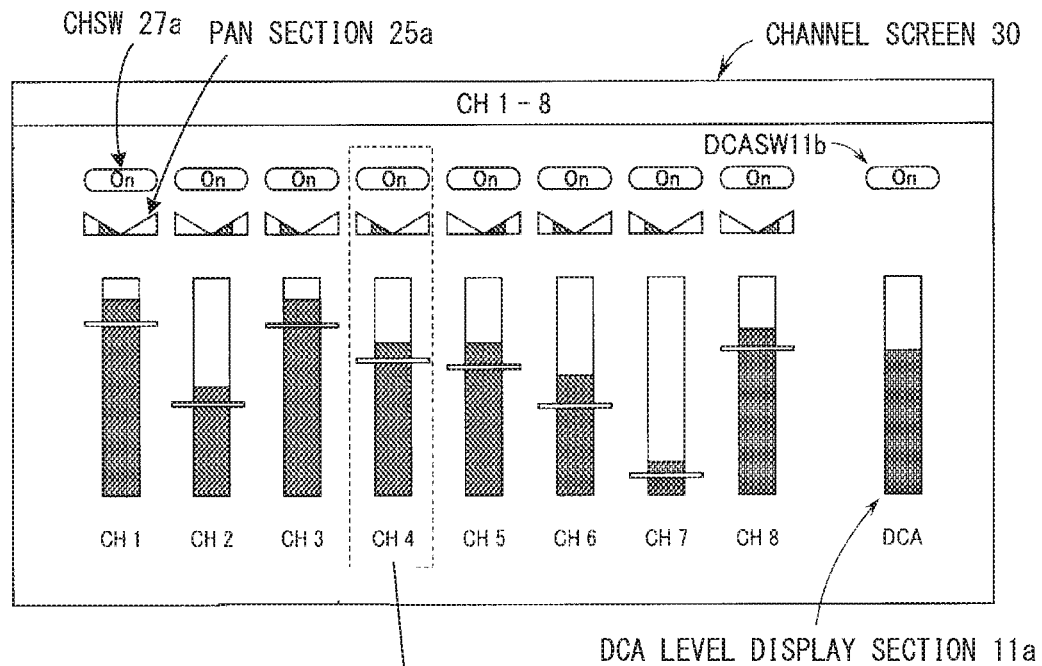
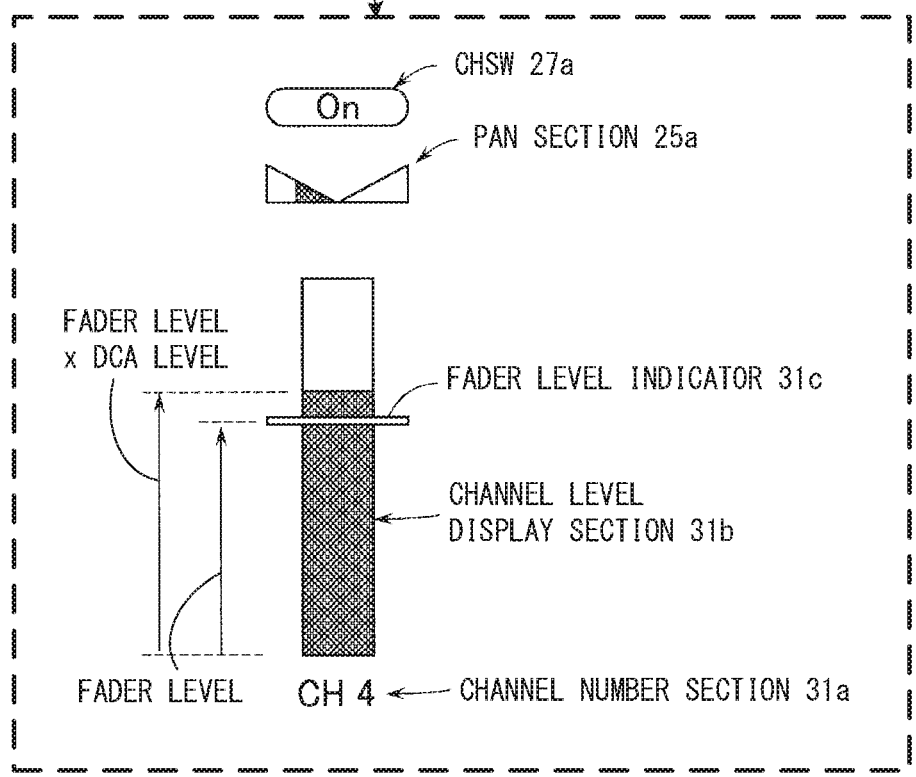

{Fig. 4B}
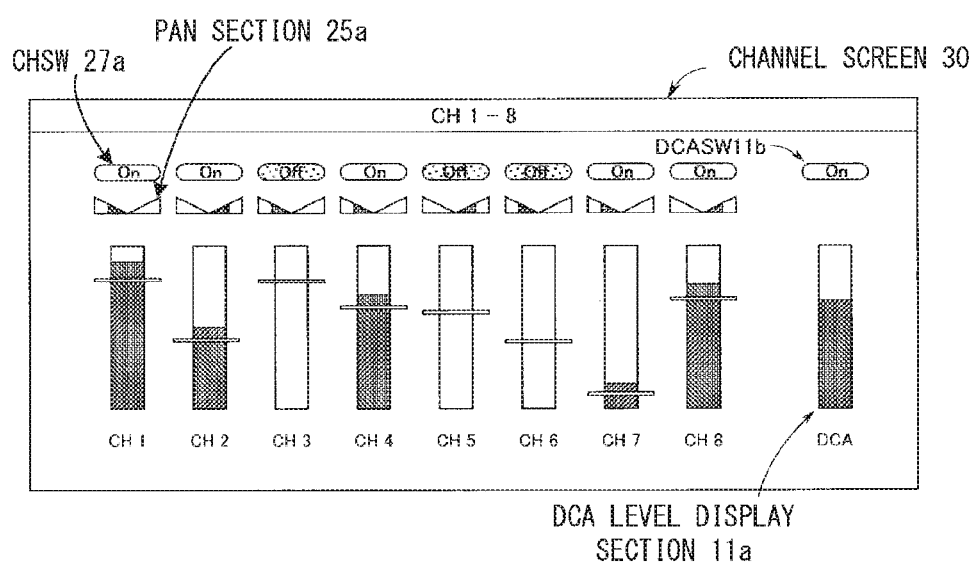

{Fig. 5}
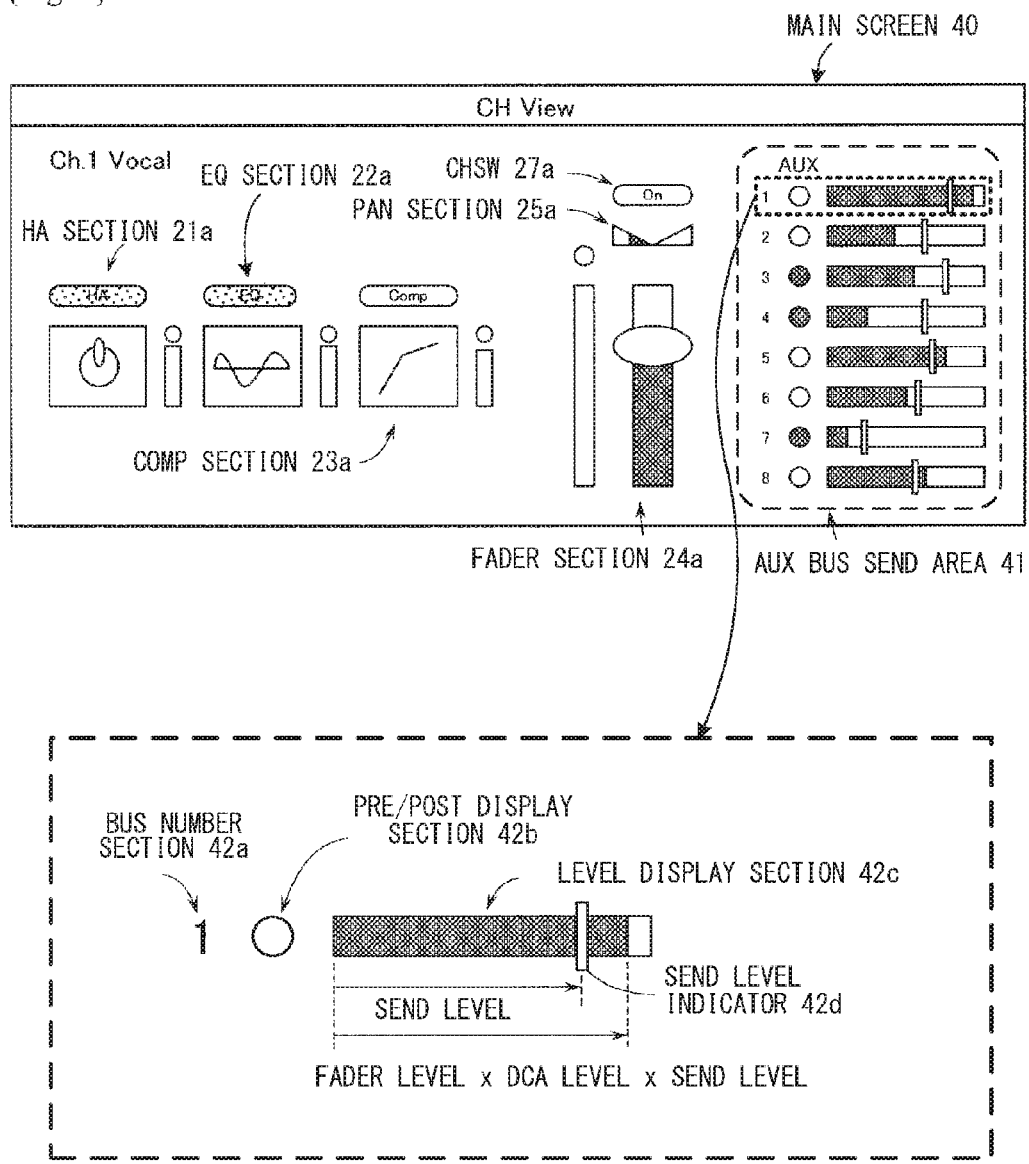

LEVEL SETTING APPARATUS AND STORAGE MEDIUM

TECHNICAL FIELD

The invention relates to a level setting apparatus capable of displaying a level set as an individual level and a level in which a level set for a group is reflected, and a storage medium containing program instructions enabling a computer to function as such a level setting apparatus.

Priority is claimed on Japan Patent Application No. 2015-48468 filed Mar. 11, 2015, the contents of which are incorporated herein by reference.

BACKGROUND ART

A mixer includes input channels for a plurality of microphone/line inputs as input signal series, and transmits an audio signal from each of the input channels to a mixing bus. The resultant audio signal from the mixing bus is outputted through a plurality of output channels being output signal series. In each input channel, frequency characteristics and a volume level are set, and further a send level for the transmission to the mixing bus is set.

In a conventional mixer, a function in which a plurality of channel faders each provided at respective input channels are put together as a DCA group, and the channel faders in the same group are operated together according to operation on a DCA fader is known. In this case, an output level actually used in volume adjustment in the input channel is a level in which a DCA level set by the DCA fader is reflected on a fader level set by the channel fader. In the conventional mixer, a position of a knob of the channel fader indicates the fader level. Further, it is known that the actually used output level is displayed by the position of the knob by moving, in response to an operation of a switch, the position of the knob of the channel fader to a position in which the DCA level of the DCA fader is reflected on the fader level (refer to PTL1). It becomes thereby possible to easily check the actually used output level by operating the switch. The DCA level set by the DCA fader is not reflected to the position of the knob of the channel fader as long as the switch is not operated, and therefore, it is possible to finely set the fader level by moving the knob of the channel fader.

CITATION LIST

Patent Literature

{PTL1} JP 2004-253876 A

SUMMARY OF INVENTION

Technical Problem

In the conventional mixer, it was possible to temporarily display the output level in which the DCA level set by the DCA fader is reflected. However, it was not possible to constantly and simultaneously display both the fader level set by the channel fader and the output level, in which the DCA level is reflected to the fader level, actually reflected to the level of the audio signal outputted from the input channel, in such a manner that the fader level and the output level can be compared with each other. Namely, there was a problem that it was impossible to compare the fader level and the output level, and the user could not effectively set the levels.

An object of the invention is to enable, in a level setting apparatus, to constantly and simultaneously display a level set for an individual channel and a level, in which a level set for a group of the channels are reflected, actually reflected to an output of the channel.

Solution to Problem

To attain the above object, a level setting apparatus of the invention is a level setting apparatus, including: an individual level controller for setting individual levels of respective channels of a plurality of channels; a group controller for forming a group to which one or more channels among the plurality of channels belong; a group level controller for setting a group level of the group; and a display controller for controlling a display to display the individual level by each channel, and as for the grouped channels, overlay-display the individual level of the channel on an output level of the channel, the output level indicating level of output from the channel based on the individual level of the channel and the group level of the group to which the channel belongs.

Advantageous Effects of Invention

In a level setting apparatus of the invention, a level in which a group level set by a group level controller is reflected on an individual level set by an individual level controller is overlay-displayed on a display of the individual level, as an output level which indicates level of the output from an individual channel as for grouped one or more channels on a display device which displays the individual level set by the individual level controller. It becomes thereby possible to compare the individual level set by the individual level controller and the output level, in which the group level set by the group level controller is reflected, actually reflected to the output, by checking the display device.

BRIEF DESCRIPTION OF DRAWINGS

FIG. 1 is a circuit block diagram illustrating a major configuration of a mixer including a level setting apparatus which is an embodiment of the invention.

FIG. 2 is a block diagram illustrating a hardware configuration of the mixer illustrated in FIG. 1.

FIG. 3 is a flowchart of a display process executed in the mixer illustrated in FIG. 1.

FIG. 4A is a view illustrating a channel screen for input channels displayed by the mixer illustrated in FIG. 1, and an enlarged view of a part thereof.

FIG. 4B is a view illustrating the channel screen in a display mode different from that in FIG. 4A.

FIG. 5 is a view illustrating a main screen for an input channel displayed by the mixer illustrated in FIG. 1, and an enlarged view of a part thereof.

DESCRIPTION OF EMBODIMENTS

A circuit block diagram illustrating a major configuration of a mixer 1 including a level setting apparatus which is an embodiment of the invention is illustrated in FIG. 1.

In FIG. 1, the mixer 1 includes n pieces of input channels 10-1, 10-2, . . . , 10-n. Frequency characteristics and levels of an audio signal to be transmitted to AUX buses 12 and an ST bus 13 are controlled at each of the input channels 10-1 to 10-n. The level setting apparatus which is an embodiment of the invention includes the input channels 10-1 to 10-$n$, and a display device, on which a later-described channel screen 30 and main screen 40 are displayed, provided on a not-illustrated panel of the mixer 1. An audio signal IN1 is inputted to the input channel 10-1, an audio signal IN2 is inputted to the input channel 10-2, ..., and an audio signal IN$n$ is inputted to the input channel 10-$n$. Each of the input channels 10-1 to 10-$n$ has the same configuration, where a head amplifier (HA) 21, an equalizer (EQ) 22, a compressor (COMP) 23, a fader (FADER) 24, a pan (PAN) 25 are connected in cascade and a send (SEND) 26 is provided. The HA 21 is an amplifier for amplifying the inputted audio signal IN (hereinafter reference signs without the subscripts such as "1" to "n" when it is not necessary to specify the individuals) to a predetermined level, the EQ 22 is an equalizer for adjusting frequency characteristics of the audio signal In1 to Inn) of the input channel 10, and for example, the EQ 22 is capable of varying the frequency characteristics of respective four bands of HI, MID HI, LOW MID, and LOW. Besides, the compressor 23 prevents that the audio signal IN of the input channel 10 is saturated by narrowing down dynamic ranges of the audio signal IN. The fader 24 is a level controller for controlling level of the audio signal IN of the input channel 10. The fader 24 is operated by the user using, for example, a moving fader. The pan 25 is for adjusting LR localization of a stereo signal transmitted from the input channel 10 to the stereo (ST) buses 13 of two lines of LR. Further, the audio signal at an extraction point either prior to or posterior to the fader 24 is supplied to the send 26, and the send 26 controls, based on values of send levels, level of the audio signal transmitted to plural pieces (m pieces) of AUX buses 12 for mixing, for each piece of the buses. In this case, a pre-fader signal from the extraction point prior to the fader 24 or a post-fader signal from the extraction point posterior to the fader 24 is selectively supplied to the send 26 for each of the m pieces of AUX buses 12. The send 26 controls the level of each signal and transmits each level controlled signal to the corresponding piece of AUX bus 12.

Besides, in the mixer 1, there is a function of forming a group of some of the faders 24 provided in the input channels 10-1 to 10-$n$ as a DCA group. The faders 24 belonging to the same DCA group are operated together according to an operation to a DCA fader 11. A group controller is provided in the mixer 1, the group controller is capable of creating a plurality of DCA groups, and an arbitrary input channel 10 can be added into or removed from an arbitrary DCA group. In the input channel 10 belonging to the DCA group, the level of the audio signal transmitted from the fader 24 is actually controlled according to an output level in which the DCA level set using the DCA fader 11 is reflected on the fader level set for the fader 24.

The mixer 1 is capable of mixing audio signals in the m pieces of AUX buses 12 and the ST bus 13 by supplying the audio signal from the respective input channels 10-1 to 10-$n$ to an arbitrary bus among the AUX buses 12 and the ST bus 13. The resultant signals mixed in the m pieces of AUX buses 12 are respectively outputted to corresponding output channels 14 among m pieces of output channels 14-1, 14-2, ..., 14-$m$. Besides, the resultant stereo signal mixed at the ST bus 13 is outputted to a stereo (ST) output channel 15. Each of the output channels 14-1, 14-2, ..., 14-$m$ and the stereo output channel 15 includes an equalizer, a compressor, a fader, and so on connected in cascade to control the frequency characteristics and the level of the audio signal inputted thereto and outputs the resultant audio signal. A block diagram illustrating a hardware configuration of the mixer 1 is shown in FIG. 2.

In the mixer 1 illustrated in FIG. 2, a signal processing on the audio signal is executed by a DSP (digital signal processor) 52. The DSP 52 performs the signal processing at each of the input channels 10-1 to 10-$n$, the AUX buses 12, the ST bus 13, the output channels 14-1 to 14-$m$, and the stereo output channel 15 under a control of a CPU (central processing unit) 50. These signal processing may be performed using software executed by the CPU 50. A total control of the mixer 1 is performed by the CPU 50. A memory 51 includes a flash memory and a RAM (random access memory). Operation software such as a level setting program executed by the CPU 50 and various data are stored in the flash memory, and work memory areas for the CPU 50, areas for storing temporary data, and so on are prepared in the RAM. Incidentally, a part of the area of the flash memory may be used as the RAM, and a rewritable non-volatile memory device such as a hard disk may be used instead of the flash memory. A display portion 53 being a display is a liquid crystal display device or the like, and screens such as later-described channel screen 30 and main screen 40 are displayed thereon. An operation portion 54 includes controls for editing various parameters used for the signal processing, including fader levels used in the faders 24, and the send levels used in the send 26, and so on. The operation portion 54 detects operations of the controls, and edits values of the parameters based on detected operations. A display portion 53 provided with a touch panel may be used. In this case, the touch panel may be used as the operation portion 54. An I/F 55 is an interface to connect with an external equipment. The I/F 55 may be a network interface, a serial interface such as a USB (universal serial bus), and so on. An audio I/F 56 includes an analog input port for inputting an audio signal to the mixer 1, an analog output port for outputting resultant audio signal processed in the mixer 1 to the external devices, and a digital input/output port for inputting a digital signal to the mixer 1 and outputting resultant digital audio signal processed in the mixer 1 to the external devices. The audio signal inputted via the analog input port is converted into a digital signal and then transmitted to an audio and communication bus 57. The digital audio signals inputted via the digital input/output port is also transmitted to the audio and communication bus 57. The DSP 52 receives the digital audio signals transmitted to the audio and communication bus 57 and performs predetermined signal processing on the digital audio signals. The audio signals outputted from the DSP 52 to the audio and communication bus 57 can be provided to a speaker or the like via the audio I/F 56.

The mixer 1 executes the level setting program which is an embodiment of the invention, and thereby, functions as a level setting apparatus described below. In the level setting apparatus, the CPU 50 performs a display process which includes calculating an actual output level (channel level) of the audio signal outputted from the fader 24 of each of the input channels 10-1 to 10-$n$ and displaying the calculated channel levels. Further, the display process includes overlay-displaying the fader levels set for the faders 24 on the display section for displaying the channel levels in the later-described channel display screen 30. In the display process, as for the input channel 10 which belongs to the DCA group, a level which is calculated by reflecting the DCA level set by the DCA fader 11 to the fader level set for the fader 24 is displayed as the channel level. On the other hand, as for the input channel 10 which does not belong to the DCA group, only the fader level is displayed and the channel level is not displayed, since the fader level set for the fader 24 is used as the channel level.

A flowchart of the display process executed by the CPU 50 is illustrated in FIG. 3. The display process is started at every predetermined timings, and once the display process starts, the display process is executed as for every channel which is to be displayed (this channel will be referred to as "target channel"). Namely, the process in FIG. 3 is repeated at the CPU 50 for every channel which is to be displayed. When the display process is started, the CPU 50 judges whether or not the target channel is a channel to which the DCA level is to be reflected (a channel belonging to the DCA group) at step S10. When the target channel does not belong to the DCA group, it is judged that the DCA level is not to be reflected, and the process goes to step S11. At the step S11, the CPU 50 displays only the fader level set for the fader 24 of the target channel on the display portion 53. Besides, when the target channel belongs to the DCA group, it is judged that the DCA is to be reflected at the step S10 and the process goes to step S12. At the step S12, the CPU 50 calculates the channel level of the target channel by multiplying the fader level by the DCA level set by the DCA fader 11, and overlay-displays the calculated channel level on the fader level set for the fader 24 of the target channel on the display portion 53. When the process at the step S11 or the step S12 ends, the display process ends. Note that the calculation of the multiplication is performed at the step S12 when the fader level and the DCA level are in linear scales. In case of dB scales, the channel level displayed on the display portion 53 is calculated by adding the DCA level to the fader level. The level to be displayed on the display portion 53 is updated and stored in a storage device in the steps S11 and S12.

A channel screen for the input channel displayed on the display portion 53 of the mixer 1 and an enlarged view of a part thereof are illustrated in FIG. 4A. The channel screen in a display mode different from that in FIG. 4A is illustrated in FIG. 4B.

The mixer 1 is capable of displaying the channel screen 30 illustrated in FIG. 4A on the display portion 53 according to an operation by a user. The channel screen 30 is a screen for displaying setting states of major parameters of each input channel 10. In the illustrated example, the setting states of the parameters of the first input channel 10-1 to the eighth input channel 10-8 are displayed on the channel screen 30. Besides, the first input channel 10-1 to the eighth input channel 10-8 belong to the DCA group, and a DCA level display section 11a for displaying the DCA level of the DCA group set by the DCA fader 11 is provided. On the upper side of the DCA level display section 11a, a DCASW 11b is provided. As for each of the first to eighth input channels 10-1 to 10-8, a later-described channel level display section 31b for displaying the channel level indicating the level of the audio signal actually outputted from the input channel 10 is provided. Further, a later-described fader level indicator 31c for displaying the fader level set by the fader 24 of each input channel 10 is overlay-displayed on the channel level display section 31b of the same input channel 10. Besides, as for each of the first input channel 10-1 to the eighth input channel 10-8, the setting states of other parameters the input channel 10 are also displayed, and they will be explained using the display section for the fourth input channel 10-4 in the enlarged view as an example.

As for the fourth input channel 10-4 whose setting states of the parameters are displayed as in the enlarged view in FIG. 4A, a channel number "CH4" of the fourth input channel 10-4 is displayed at a channel number section 31a, and the channel level display section 31b and the fader level indicator 31c are provided at an upper side thereof. The fader level indicator 31c is a mark in a laterally long and narrow rectangular form which simulates a knob of the fader, and indicates the value of the fader level by a height position from a bottom of the channel level display section 31b. The channel level display section 31b is displayed by a rectangular frame which is longitudinally long, and for example, the channel level is displayed by a length of a deep color bar from a bottom. The channel level displayed in the channel level display section 31b indicates a level value used for controlling the level of the audio signal outputted from the input channel 10 (the channel level can by calculated using the formula of: (the fader level set for the fader 24)×(the DCA level set by the DCA fader 11)). The channel level indicates level of the audio signal outputted from the fader 24 and then outputted from the channel 10. The above fader level indicator 31c is overlay-displayed on the channel level display section 31b using a common scale in the height direction. A pan section 25a for displaying the localization state of the pan 25 is provided on an upper side of the channel level display section 31b, and a channel switch (CHSW) 27a for turning on and turning off the input channel 10 is displayed on a further upper side thereof. A switch corresponding to the CHSW 27a is inserted into a line connecting the fader 24 and the pan 25 illustrated in FIG. 1 at a position prior to the branch for outputting the post-fader audio signal to the AUX buses 12 and the ST bus 13. Therefore, when the switch is turned off according to an operation on the CHSW 27a, the transmissions from the fader 24 to the AUX buses 12 and the ST bus 13 are turned off.

Note that when displaying the channel level display section 31b, the channel level which actually indicates the level of the audio signal transmitted from the fader 24, which is calculated in the display process illustrated in FIG. 3, is read out from the memory, and the length of the displayed deep color bar is determined to be a length corresponding to the channel level. In the illustrated case, the fourth input channel 10-4 (the name of which is "CH4") belongs to the DCA group, and the channel level in which the fader level set for the fader 24 of the fourth input channel 10-4 is multiplied by the DCA level set by the DCA fader 11 is displayed. The display styles are also the same in the other input channels (CH1 to CH3, CH5 to CH8).

As stated above, when the channel screen 30 is displayed, the fader level which is set for the fader 24 is overlay-displayed on the channel level which indicates the level of the audio signal transmitted from the fader 24, thereby displaying the fader level and the channel level constantly and simultaneously. Accordingly, it becomes possible for the user to effectively set the levels while comparing the fader level and the DCA level by checking the channel screen 30.

Incidentally, when the CHSW 27a is turned off as stated above, the audio signal is not outputted from the fader 24 to the AUX buses 12 and the ST bus 13, and therefore, the level of the audio signal which is actually transmitted from the fader 24 becomes a minimum level. The display style of the channel screen 30 when the CHSW 27a is turned off is illustrated in FIG. 4B.

In the example illustrated in FIG. 4B, the CHSWs 27a of the third, fifth and sixth input channels 10-3, 10-5 and 10-6 (the names are "CH3", "CH5", and "CH6") are turned off, and the CHSWs 27a are displayed in gray. In each of the channel level display sections 31b of the third, fifth and sixth input channels 10-3, 10-5 and 10-6 respectively indicated by the names of "CH3", "CH5", and "CH6", the zero level is displayed as the channel level indicating the level of the audio signal outputted from the input channel 10. However, the fader level which is set for the fader 24 is displayed at the fader level indicator 31c regardless of the turning on and off of the CHSW 27a. Note that in the above-stated display process, the turning on and off of the CHSW 27a is reflected to the channel level indicating the level of the audio signal outputted from the input channel 10, and the zero level is obtained through the calculation and displayed when the CHSW 27a is turned off. Note that the zero level is obtained when the fader level and the DCA level are in the linear scales, and the minimum level is obtained in case of the dB (decibel) scales.

A constitution of the main screen 40 of the input channel displayed on the display portion 53 of the mixer 1 which is an embodiment of the invention and an enlarged view of a part thereof is illustrated in FIG. 5.

When the user performs an operation to display the main screen 40, the main screen (CH View) 40 for the input channel 10 illustrated in FIG. 5 is displayed on the display portion 53. The illustrated example is the main screen 40 for the first input channel 10-1, and the channel name of "Ch. 1 Vocal" and various parameters set for the first input channel 10-1 are displayed. Note that a not-illustrated channel move button is provided in the mixer 1, and the main screen 40 for any of the input channels from among the second to n-th input channel 10-2 to 10-n can be displayed by operating the channel move button. The main screen 40 has a common constitution for all of the input channels. The main screen 40 includes: a HA section 21a made up of a knob which indicates the gain of the HA 21 by a rotation angle and a level meter; an EQ section 22a made up of a graph of the frequency characteristics of the EQ 22 and a level meter; and a Comp section 23a made up of a graph representing the output level characteristics of the compressor 23 and a level meter. These sections are disposed from a left side to an approximate center portion. Further, a Fader section 24a which includes a knob for setting the fader level of the fader 24 and a level meter thereof are displayed on the right side of the Comp section 23a. The PAN section 25a which indicates the localization position of the PAN 25 is displayed on the upper side of the Fader section 24a. The CHSW 27a for turning on and off the input channel is displayed on the further upper side of the PAN section 25a. Further, on the right side of the above sections, displayed is an AUX bus send area 41 including: a later-described level display section 42c which overlay-displays send levels set by send faders provided for the send 26 onto the levels of the audio signals actually transmitted to each bus of the m pieces of AUX buses 12; and a later-described Pre/Post display section 42b. An example of the AUX bus send area 41 in which the AUX buses 12 has eight pieces of the buses is illustrated in FIG. 5.

A display style of the section relating to the first bus of the AUX buses 12 among the AUX bus send area 41 is enlarged in FIG. 5. As illustrated in this drawing, in the enlarged section, bus number of "1" is displayed at a bus number section 42a, the Pre/Post display section 42b is disposed on the right side thereof, and the level display section 42c which indicates the send level set by the send fader by a position of a send level indicator 42d which simulates a knob of the fader is displayed on the a right side of the Pre/Post display section 42b. The audio signal which is outputted from the send 26 connected to the first bus is supplied to the first bus of the AUX buses 12. The Pre/Post display section 42b indicates, with an outlined circle, that the audio signal of pre-fader (PRE) is supplied from an extraction point prior to the fader 24 to the send 26 which is connected to the first bus, and indicates, with a marked-out black circle, that the audio signal of post fader (POST) is supplied from an extraction point posterior to the fader 24 to the send 26 which is connected to the first bus. Besides, a level indicating the level of the audio signal which is actually transmitted from the send 26 is calculated by multiplying the channel level calculated in the display process illustrated in FIG. 3 by the send level set by the send fader, and the calculated level is displayed in the level display section 42c by a length of a bar in a deep color. The send level indicator 42d indicating the send level is overlay-displayed on the corresponding level display section 42c. The display styles are the same as for the other buses of the AUX buses 12.

As stated above, the send level and the level of the audio signal which is actually transmitted from the send 26 can be constantly and simultaneously displayed in the AUX bus send area 41 due to the above overlay-display. Accordingly, it becomes possible for the user to effectively set the levels of the audio signals transmitted from the respective input channels 10 to the respective buses among the AUX buses 12 while comparing the send level, the fader level and the DCA level by checking the AUX bus send area 41.

INDUSTRIAL APPLICABILITY

In the mixer including the level setting apparatus which is an embodiment of the invention described hereinabove, the function to set the fader levels for the faders 24 each provided at the respective input channels corresponds to an individual level controller for setting individual levels of respective channels of a plurality of channels. Besides, the DCA fader 11 and the function to set the DCA level corresponds to a group level controller for setting a group level of the group. The group controller creating a plurality of DCA groups, and adding an arbitrary input channel 10 into or removing an arbitrary input channel 10 from an arbitrary DCA group corresponds to a group controller for forming a group to which one or more channels among the plurality of channels belong. The function to display the channel level at the channel level display portion 31d and overlay-display the fader level set for the fader 24 at the fader level indicator 31c on the channel level display portion 31d corresponds to a display controller for controlling a display to display the individual level by each channel, and as for the grouped channels, overlay-display the individual level of the channel on the output level of the channel. The channel level indicating the level of the audio signal actually outputted from the input channel 10 and calculated by multiplying the fader level by the DCA level corresponds to the output level indicating level of output from the channel based on the individual level of the channel and the group level of the group to which the channel belongs.

Note that as for the input channel which does not belong to the DCA group, only the fader level is displayed in the mixer, but the channel level which is the same value as the fader level may be displayed at the fader level indicator 31c.

The above-described send 26 of the mixer 1 includes m pieces of selectors which is the same number as the AUX buses 12 for selecting the pre-fader signal or the post-fader signal and m pieces of send portions which are respectively connected in cascade to the selectors. The send level is set for each transmission from each send portion to each of m-pieces of AUX buses 12.

The level setting apparatus according to the invention has been described as the level setting apparatus of the mixer, but it is not limited thereto, and for example, the level setting apparatus may be a level setting apparatus which controls illumination levels of respective illuminations of an illumination device including a plurality of illuminations. In this case, individual illumination levels of the plurality of illuminations can be set by the individual level controller, and the illumination levels of a group of illuminations can be collectively controlled by the group level controller.

REFERENCE SIGNS LIST

1 . . . mixer, 10-1 to 10-$n$ . . . input channel, 11 . . . DCA fader, 11$a$ . . . DCA level display section, 11$b$ . . . DCASW, 12 . . . AUX bus, 13 . . . ST bus, 14-1 to 14-$m$ . . . output channel, 15 . . . stereo output channel, 21 . . . HA, 21$a$ . . . HA section, 22 . . . EQ, 22$a$ . . . EQ section, 23 . . . compressor, 23$a$ . . . Comp section, 24 . . . fader, 24$a$ . . . Fader section, 25 . . . pan, 25$a$ . . . PAN section, 26 . . . send, 30 . . . channel screen, 31$a$ . . . channel number section, 31$b$ . . . channel level display section, 31$c$ . . . fader level indicator, 40 . . . main screen, 41 . . . AUX bus send area, 42$a$ . . . bus number section, 42$b$ . . . Pre/Post display section, 42$c$ . . . level display section, 42$d$ . . . send level indicator, 50 . . . CPU, 51 . . . memory, 52 . . . DSP, 53 . . . display portion, 54 . . . operation portion, 55 . . . I/F, 56 . . . audio I/F, 57 . . . audio and communication bus

The invention claimed is:

1. A level setting apparatus, comprising:
a fader configured to set an individual level of a respective channel of a plurality of channels;
a DCA fader configured to set a group level of a group of channels including one or more channels among the plurality of channels; and
a display device configured to display the individual level for each channel, and as for the one or more channels included in the group of channels, overlay-display the respective individual level of the one or more channels on an output level of the respective channel, the output level indicating a level of output from the respective channel based on the individual level of the respective channel set by the fader and the group level of the group to which the respective channel belongs set by the DCA fader.

2. The level setting apparatus according to claim 1, wherein the display device displays the output levels and the individual levels of the plurality of channels side-by-side for each channel.

3. The level setting apparatus according to claim 1, further comprising:
a switch for turning on and off a corresponding channel among the plurality of channels,
wherein the display device displays the output level as a minimum level for the channel being turned off.

4. A level setting apparatus, comprising:
a plurality of channel faders, each of the plurality of channel faders being for setting an individual level of a corresponding input channel among a plurality of input channels;
a group fader for setting a group level of a group of input channels including one or more input channels among the plurality of input channels;
a first calculator for calculating an output level of each of the plurality of input channels based on the individual level of the corresponding input channel set by the corresponding channel fader and the group level of the group to which the corresponding input channel belongs set by the group fader, the output level indicating a level of output from the corresponding input channel; and
a display for displaying, on a first screen, the individual level of each of the plurality of input channels, and as for the one or more input channels included in the group of input channels, overlay-displaying the individual level of the corresponding input channel on the output level of the corresponding input channel.

5. The level setting apparatus according to claim 4, wherein the first screen comprises a level display section for displaying the output level of each of the plurality of input channels by a length of a bar, and
the display overlay-displays the individual level of the corresponding input channel on the output level of the corresponding input channel by displaying a mark on the level display section at a position corresponding to the individual level of the corresponding input channel.

6. The level setting apparatus according to claim 4, further comprising:
a plurality of send level controllers for setting send levels for respectively controlling levels of outputs from an input channel to respective mixing buses;
a second calculator for calculating, as for a not-grouped input channel among the input channels, send-output levels based on the individual level of the not-grouped input channel and the respective send levels from the not-grouped input channel to the respective mixing buses, and as for a grouped input channel among the input channels, the send-output levels based on the individual level of the grouped input channel, the group level of the group to which the grouped input channel belongs, and the respective send levels from the grouped input channel to the respective mixing buses,
wherein the display overlay-displays, on a second screen, the send levels of an input channel on the send-output levels of the input channel regarding every mixing bus.

7. The level setting apparatus according to claim 6, wherein the second screen comprises a level display section for displaying the send-output levels by a length of a bar, and
the display overlay-displays the send levels on the send-output levels using the level display section and a mark placed on the level display section at a position corresponding to the send levels to be displayed.

8. A non-transitory machine-readable storage medium containing program instructions executable by a computer and enabling the computer to execute a process comprising:
setting an individual level of a respective channel of a plurality of channels;
setting a group level of a group of channels including one or more channels among the plurality of channels; and
displaying the individual level for each channel, and as for the one or more channels included in the group of channels, overlay-displaying the respective individual level of the one or more channels on an output level of the respective channel, the output level indicating a level of output from the respective channel based on the set individual level of the respective channel and the set group level of the group to which the respective channel belongs.

* * * * *